United States Patent
Grimmer et al.

(10) Patent No.: US 7,425,294 B2
(45) Date of Patent: Sep. 16, 2008

(54) PLASTIC SKIN FORMING PROCESS

(76) Inventors: Robert A. Grimmer, 37 Hubbard Rd., Berwick, ME (US) 03901; Dave Syphers, P.O. Box 713, Berwick, ME (US) 03901; Denis Moore, 17 Old Indigo Hills Rd., Rollinsford, NH (US) 03869

( * ) Notice: Subject to any disclaimer, the term of this patent is extended or adjusted under 35 U.S.C. 154(b) by 0 days.

(21) Appl. No.: 10/433,361

(22) PCT Filed: Oct. 9, 2002

(86) PCT No.: PCT/US02/32413

§ 371 (c)(1),
(2), (4) Date: Nov. 17, 2003

(87) PCT Pub. No.: WO03/031139

PCT Pub. Date: Apr. 17, 2003

(65) Prior Publication Data

US 2004/0065981 A1    Apr. 8, 2004

Related U.S. Application Data

(60) Provisional application No. 60/327,979, filed on Oct. 9, 2001.

(51) Int. Cl.
*B29C 35/02* (2006.01)
*B29C 35/16* (2006.01)
*B29C 67/06* (2006.01)
*B29C 39/04* (2006.01)
*B29C 33/34* (2006.01)

(52) U.S. Cl. .................... 264/302; 264/402; 425/174.4

(58) Field of Classification Search ......... 264/301–306, 264/309, 402; 425/144, 435, 470
See application file for complete search history.

(56) References Cited

U.S. PATENT DOCUMENTS

| 3,315,016 A | 4/1967 | Wersosky et al. ............. 264/25 |
| 3,346,723 A | 10/1967 | Mohn et al. |
| 3,419,455 A | 12/1968 | Roberts |
| 3,449,546 A | 6/1969 | Dhoble |
| 3,488,411 A | 1/1970 | Goldman |
| 3,507,950 A | 4/1970 | Barnett et al. |

(Continued)

FOREIGN PATENT DOCUMENTS

DE    EP-0334074    3/1989

(Continued)

OTHER PUBLICATIONS

Supplementary European Search Report dated Jun. 6, 2006 issued in the counterpart European Patent Application No. 02769039.5 filed Jul. 23, 2003 (3 pgs).

(Continued)

*Primary Examiner*—Matthew J. Daniels
(74) *Attorney, Agent, or Firm*—Grossman, Tucker, Perreault & Pfleger, PLLC

(57) ABSTRACT

An apparatus and method of producing plastic articles comprising preheating a metal mold (10) using infrared energy to establish a casting temperature, casting plastic material onto the preheated mold surface, fusing the plastic into a substantially uniform layer using infrared energy, cooling the metal mold using evaporative cooling, and removing the cast plastic article from said metal mold (10).

11 Claims, 3 Drawing Sheets

U.S. PATENT DOCUMENTS

| | | | |
|---|---|---|---|
| 3,564,656 A | 2/1971 | Barnett | |
| 3,677,670 A | 7/1972 | Mori et al. | 425/62 |
| 3,728,429 A | 4/1973 | Colby et al. | 264/302 |
| RE28,497 E | 7/1975 | Gasmire | |
| 3,971,674 A | 7/1976 | Brandt et al. | |
| 4,217,325 A | 8/1980 | Colby | 264/245 |
| 4,298,324 A | 11/1981 | Soulier | 425/174.8 |
| 4,389,177 A | 6/1983 | Colby | 425/144 |
| 4,583,932 A | 4/1986 | Meuret | 425/182 |
| 4,623,503 A | 11/1986 | Anestis et al. | 264/302 |
| 4,740,337 A | 4/1988 | Gale et al. | 264/40.6 |
| 4,755,333 A | 7/1988 | Gray | 264/37 |
| 4,759,333 A | 7/1988 | Shimomura et al. | 123/494 |
| 4,898,697 A | 2/1990 | Horton | 264/37 |
| 4,929,293 A | 5/1990 | Osgar | 156/158 |
| 4,946,638 A | 8/1990 | Takamatsu | 264/302 |
| 4,946,663 A | 8/1990 | Audley et al. | 423/447.1 |
| 4,979,888 A * | 12/1990 | Bauer et al. | 425/174.4 |
| 5,002,476 A | 3/1991 | Kerr | |
| 5,032,076 A | 7/1991 | Jackson, Jr. | |
| 5,059,446 A | 10/1991 | Winkle, Sr. et al. | 427/32 |
| 5,106,285 A | 4/1992 | Preston | 425/144 |
| 5,308,700 A | 5/1994 | Hikasa et al. | 428/402 |
| 5,439,406 A | 8/1995 | Fuwa et al. | |
| 5,441,675 A | 8/1995 | Souders | 264/25 |
| 5,466,412 A | 11/1995 | Parker et al. | 264/255 |
| 5,580,501 A | 12/1996 | Gallagher et al. | 264/45.3 |
| 5,840,229 A | 11/1998 | Sugimoto et al. | 264/142 |
| 5,993,721 A | 11/1999 | Kurihara et al. | 264/402 |
| 6,013,210 A | 1/2000 | Gardner, Jr. | 264/40.1 |
| 6,019,390 A | 2/2000 | Keshavaraj | 280/743.1 |
| 6,019,590 A | 2/2000 | McNally | 425/270 |
| 6,071,456 A | 6/2000 | Hanamoto et al. | |
| 6,082,989 A | 7/2000 | McNally | 425/435 |
| 6,241,929 B1 | 6/2001 | Akopyan | 264/219 |
| 6,299,817 B1 | 10/2001 | Parkinson | 264/402 |

FOREIGN PATENT DOCUMENTS

| | | | |
|---|---|---|---|
| EP | 0 366 407 A | | 5/1990 |
| EP | 0887378 | * | 12/1998 |
| GB | EP-0918 065 | | 5/1999 |
| JP | 63-183819 | | 7/1988 |
| JP | 1275108 A | | 11/1989 |
| JP | 6-190846 | | 7/1994 |
| JP | 10-103623 | * | 4/1998 |

OTHER PUBLICATIONS

International Search Report dated Mar. 3, 2005 issued in the corresponding International Appln. No. PCT/US04/26724 filed Aug. 16, 2004 (3 pgs).

Harris, Daniel C., Materials For Infrared Windows and Domes, 1999, SPIE Optical Engineering Press, pp. 1-6 (Cited in the corresponding CIP U.S. Appl. No. 10/641,997 by the US Examiner).

* cited by examiner

PLASTIC SKIN FORMING PROCESS

CROSS REFERENCE TO RELATED APPLICATION

This application is the National Stage of International Application No. PCT/US02/32413 filed Oct. 9, 2002 and published Apr. 17, 2003 as International Publication No. WO 03/031139, designating the United States, and which claims benefit of U.S. Provisional Application No. 60/327,979 filed Oct. 9, 2001.

FIELD OF INVENTION

The present invention relates to an improved method for forming relatively thin plastic skins or shells from a mold surface using infrared heating and evaporative cooling. More particularly, the method relates to the manufacture of thin thermoplastic shells or skins used as the outer surface for automotive interior trim products such as instrument panels, door panels, headrests, console covers, air bag doors, glove box doors and the like.

BACKGROUND OF THE INVENTION

Over many decades, the processes for forming thin skins of thermoplastic on a mold surface have evolved, driven primarily by cost and weight objectives.

Early on, electroformed nickel and nickel/copper molds were filled with a predetermined charge of liquid plastisol and rotated through a gas fired oven and into a water spray section to produce shells which were subsequently filled with urethane foam and used as vehicle arm rests and the like. Usually, the apparatus used for producing these shells was a series of multi-armed spindles that indexed between filling, heating, cooling and stripping stations.

As the demand for soft feel interior trim products for automobile interiors increased in the 1950's and 1960's, larger parts were demanded, such as instrument panels. This lead to a "slush molding" process as opposed to rotational molding, where liquid plastisol was pumped into a preheated electroformed mold to coat the mold surface (gel) and the excess dumped out before the mold indexed into the fuse and cooling stations. The large electroformed nickel tools could not be rotated in various axes due to their size nor did they need to be, as the products were becoming long and relatively flat. This led to an over and under conveyorized process which required a large number of electroformed molds (10-30) to be used in order to fill a continuously moving production line. Here, either gas fired burners or induction heating coils that resembled the contour of the mold and of the final product were used to provide heat in stations for gelling and fusing the plastic. This conveyorized process also limited the number of shapes of molds that could be processed without facility modification to basically one as the heating apparatus were shape specific.

Because of the space requirements of the conveyorized line and the cost of using many electroformed molds, a modular slush process evolved. Here a single electroformed mold was rotated around its major axis and heat and cooling supplied to it. Stainless steel tubing was welded to the back side of the electroformed mold and hot or cool heat transfer fluid was circulated through the tubes to heat and cool the mold and the liquid plastisol contained in the mold. Cleanliness was difficult to maintain in this process as thicker sections of the plastic skin, particularly drips and runs from the excess liquid plastisol being dumped out, would remain unfused and transfer to both the station operator and adjacent shells. Powder slush formations for PVC as well as other thermoplastics (TPU, TPE, TPO, ASA, etc.) next evolved to minimize waste in the slush process and produce skins of more uniform thickness. Here only a defined thickness of powder next to the mold surface melted and the unmelted powder was returned to the powder box for future use. The modular process resulted in the use of fewer molds and rapid mold changes.

A further difficulty with stainless steel tubes welded onto the electroform molds was one of shortened mold life. The heat stresses that the nickel mold was exposed to during welding of the tubes to the mold resulted in mold cracking. To solve this, other means of heating the mold were explored. Dipping the electroform into a fluidized bed (U.S. Pat. No. 4,946,663 to Takamatsu) or into a heat transfer medium was employed. Induction heating (U.S. Pat. No. 4,898,697 to Horton commonly assigned and incorporated herein by reference), and microwave heating methods have been noted. A hybrid method utilizing a robot and multiple stations is disclosed in U.S. Pat. No. 4,755,333 to Gray (commonly assigned and incorporated herein by reference).

Most popular was a modular processing apparatus where a mold box was used to enclose the back side of the nickel electroform mold and gas fire heated hot air was impinged through tubes at high velocity onto the backside of the electroformed mold to provide fast heating (or outside ambient air cooling) cycles. U.S. Pat. Nos. 6,019,390 and 6,082,989 to McNally and U.S. Pat. No. 6,013,210 to Gardner describe variations on this process. On relatively cool ambient days, cycles in the order of 4 minutes could be achieved. However, to move to the next level of cycle improvement, some of the disadvantages of this apparatus needed to be overcome. The hot air impinging in the back of the electroformed mold was at such a pressure that the nickel mold would flex and ultimately crack due to fatigue. The modular processing apparatus evolved to a large mold stand with a gas fired burner overhead and many feet of duct work supplying hot and cool air that were inefficiently heated and cooled. Ambient noise and heat pollution became issues for the station operators.

What is needed is a process that heats and cools only the mold and plastic skin material that it contains, a process that allows for the use of thin lightweight molds, an environmentally friendly process with little noise and wasted heat, and a process apparatus that can be converted from one mold/product shape to another rapidly to reduce process downtime.

SUMMARY OF THE INVENTION

The present invention addresses the deficiencies of the prior art by providing an efficient skin-forming process utilizing lightweight molds heated via infrared (IR) energy and cooled through evaporation via a water/air mist spray. Since the IR energy is directed only at the backside of the mold surface utilizing heater elements that are contoured to match the mold, little heat is wasted and heating of ducting and the surrounding ambient area, is eliminated. Since the molds are not subjected to other stresses (air pressure, etc.) than their own weight, thinner and therefore, more uniform electroformed molds can be used, further decreasing cycle time and any propensity to stress crack. Evaporative cooling, using the latent heat of vaporization of water, yields a reduction in cooling time, which is also enhanced by the thinner more uniform electroform and the elimination of cooling duct work.

A further embodiment is the use of heat absorptivity as a means to tune or balance the heat input into various areas of the electroformed mold. Use of black paint on the backside of the mold facing the IR heaters can help heat thicker mold sections faster or conversely lighter shades of paint (grey) can slow the heating of thin mold sections or reduce the plastic skin thickness formed in that area to nil, saving material and reducing the need to trim off excess waste. Improved heat balance is possible via this method of painting various shades of grey on the backside of the mold and can lead to more uniform shell gloss, reducing the need to post-paint. Improved heat distribution is also critical to ensure the casting of a skin of uniform thickness of many of the newer powdered thermoplastics such as TPU, TPE and TPO's, some of which can have a very distinct melt point.

In another embodiment, with infrared heating, technology now exists to make thermoplastic materials more sensitive or conducive to heating by IR energy by adding materials to them that improve their heat absorptivity further reducing cycle time.

The casting process can be organized in a number of ways, by using an over-and-under conveyor holding a number of molds, or in a modular fashion, but preferably by utilizing 3 stations and a robot to manipulate the mold from preheat (A) to casting (B), and back to heating (A), then to cooling (C) and stripping as shown in the appended drawings.

BRIEF DESCRIPTION OF THE DRAWINGS

These and other objects, features and advantages of the invention will become apparent upon consideration of the description of the invention and the appended drawings in which.

DESCRIPTION OF THE PREFERRED EMBODIMENT

Figure 1:
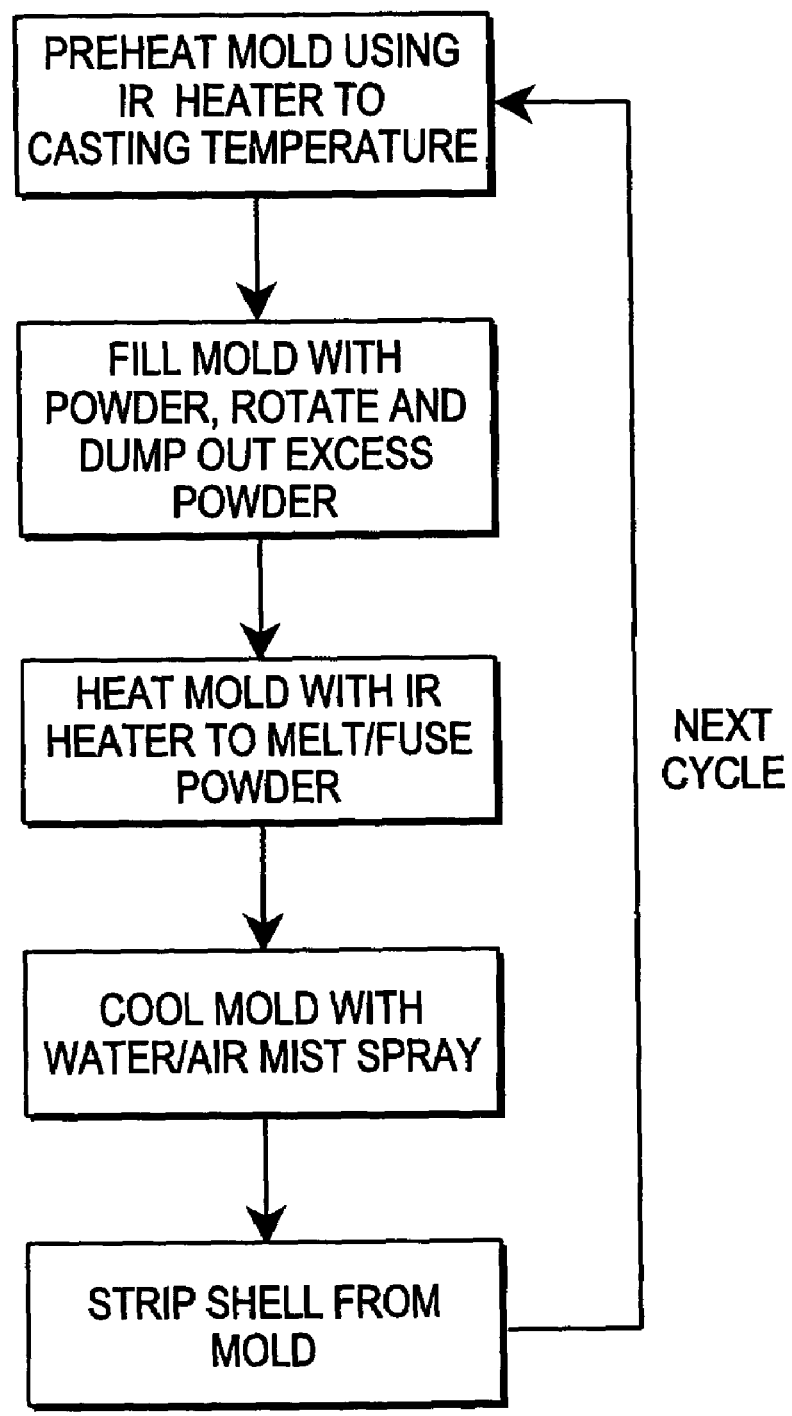
FIG. 1 is a flow chart describing the process steps of the present invention.

As noted above, FIG. 1 is a flow chart depicting the process steps used in the invention to produce plastic skins for automotive trim applications. A thin electroformed nickel mold is preheated using electric infrared heaters and when the mold reaches the preferred powder casting temperature for the specific plastic powder being processed, the mold is filled with powder, by using a powder box which clamps onto the mold face and when inverted fills the mold cavity with powder. The mold is then rotated generally around its major axis to allow the powder to contact the exposed heated inner surface of the electroformed mold and melt on this heated mold surface. Next the mold/powder box combination is inverted and any unmelted powder falls back into the powder box which is then unclamped and retracted. The mold is then sprayed with a fine mist of water and air to cool its surface to the desired stripping temperature. Once the stripping temperature is reached, the cooled solid skin is removed and the next cycle initiated. Liquid thermoplastic formulations such as plastisols or organisols can be processed in a like manner.

Figure 2:
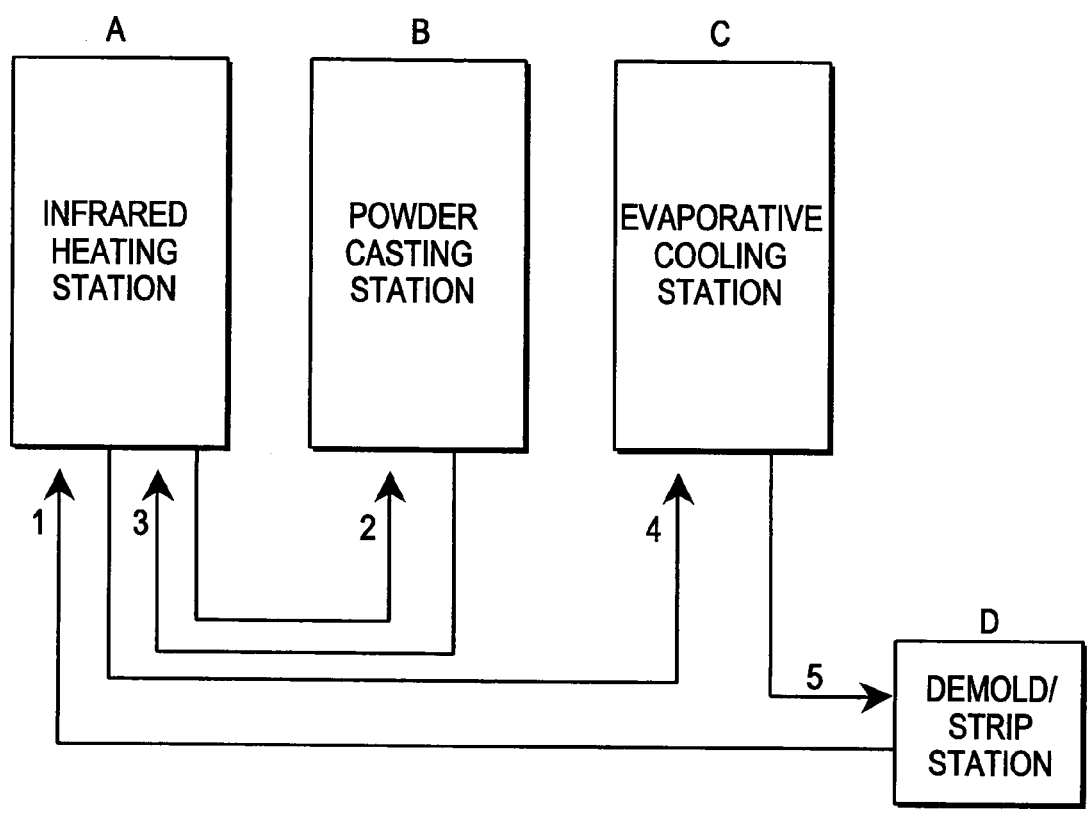
FIG. 2 is an exemplary schematic drawing of a process sequence in accordance with the present invention.

FIG. 2 depicts this process in greater detail. While shown here as basic apparatus stations, it can take the form of a moving or indexing line, a robot manipulator and multiple stations as disclosed in 4,759,333 to Gray (and incorporated herein by reference), or any other sequence that is consistent with FIGS. 1 and 2, including casting multiple layers of plastic, multiple types of plastic and foamed layers of thermoplastic to form skins or shells.

More particularly, an electroformed nickel mold is formed having the surface pattern (grain, texture, decoration) and contour desired for the final automotive skin or shell. Preferably, this electroform is of a relatively uniform thickness between 0.100"-0.150" to minimize the weight of nickel to be heated and cooled and to minimize internal stresses on the mold. Thinner molds are possible depending on their shape and on their ability to support their own weight and that of the powder which must fill the mold to adequately coat the surface area to make a complete and uniform skin. Electric IR heaters are preferred as the energy, source as they are not noisy, do not emit gaseous pollution and are portable, allowing the heating elements to be contoured to match up to each specific mold shape. Targeting a time duration of one minute to heat the combined mold mass and powder covering its surface, about 47 watts/in 2 of energy are needed. It was found that the most desirable infrared wavelength was 2.1-3.0 microns in order to generate sufficient output temperature (1275-2000 degrees F.) yet provide a reasonable heater element life and minimal potential safety hazards. Using 277 volt/three phase power, a heater capable of generating 47 watts/in 2 output produced a consistent operating output temperature of 1450 degrees F. Tubular IR heater elements made of an Inconel outer sleeve and an Inconel wire element packed inside the Inconel sleeve with magnesium oxide provided the desired energy. The tubular heaters were provided with cold ends which simplified mounting and fiber washers sealed each end of the sleeve to allow moisture to vent. The tubular heaters were bent in a pattern to conform to the backside of the electroformed mold about 1-3 inches off the mold surface and about 1-3 inches apart running lengthwise along the mold to uniformly cover the area of the mold to be heated. A thermocouple was installed on the front surface of the mold at a point of average mold thickness to sense the temperature and control the tubular heater elements. To correct any problem with "cross-fire" (the problem of one heater element facing another and driving the opposite heater beyond its setpoint), each heater element was independently controlled using a solid state relay coupled with a voltage regulator. By connecting a thermocouple to each heater element, if one heater starts to override the adjacent heat element, the thermocouple alerts the solid state controller which is programmed to reduce the voltage to that heater, preventing burnout. Thus a heater array was provided which yields a uniform and consistent temperature, is specific to each mold shape and is portable such that it can easily be exchanged when a new mold shape is used. Thus, a most desirable heating source is provided without moving parts and without potential pollution issues of noise, heat and fumes.

To further balance the heat absorbed by the electroformed mold to yield a more uniform skin or shell thickness, especially in complex and undercut shapes, the use of black body absorptivity was employed. Black paint capable of withstanding the temperatures encountered was applied to the backside of the tool to aid in heat transfer. Nickel has an emissivity of 0.11 while a glossy black paint surface has an emissivity of 0.86. Since the plastic skin or shell being formed should be as uniform as possible, usually around 0.025-0.040 inches in thickness, in order to use as little powder as possible to cast each shell, heat balancing of the mold is necessary. This is usually carried out using thermography techniques first to adjust the shape of the heater elements and distance from the mold back surface and finally, by sectioning and measuring the cast skins or shells for thickness every inch or so in both x and y dimensions. It was found that a fine tuning heat balance can be accomplished through the application of different shades of gray scale paint to the mold back surface. Particularly in areas of the mold which are thin (due to the complex geometry being electroformed) and in "waste" areas where little or no skin or shell is desired, such as might get trimmed out of openings in the final product or peripheral edges, light colored shades of grey paint may be applied to reduce the heat absorbed (and therefore the thickness of shell formed due to less melting of the powder). Further, more uniform mold temperatures result in more uniform gloss and color readings for the final cast skin or shell.

Figure 3:
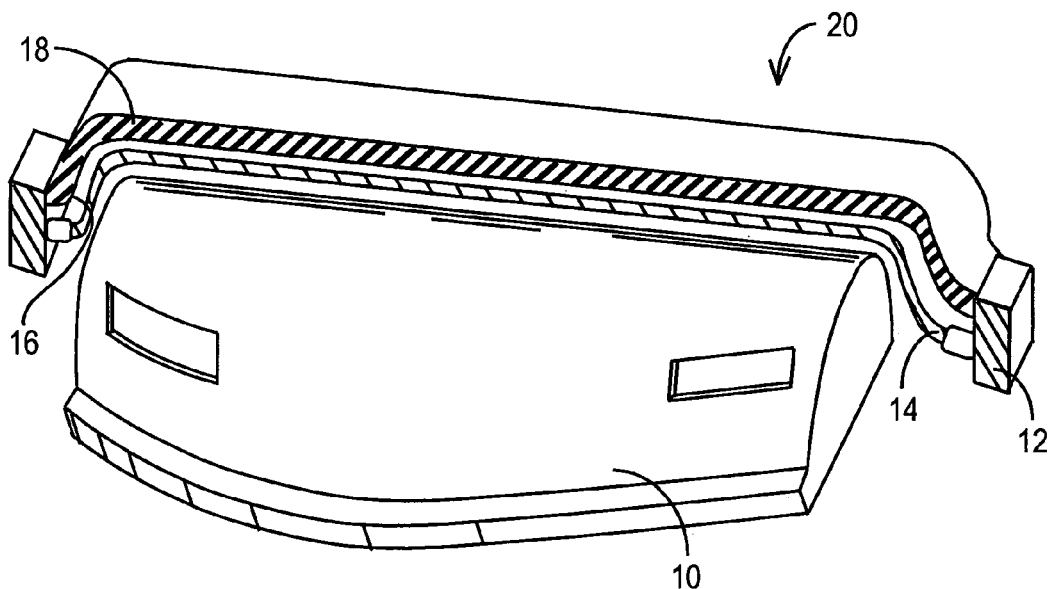
FIG. 3 is a sectional view of the contoured heating apparatus of the present invention.

FIG. 3 is a sectional view of the heating apparatus of the present invention. An electroformed nickel mold 10 is placed under an IR heating apparatus 20. IR heating elements 14 preferably run in a parallel array along the length of the mold and are contoured to follow the molds surface spaced off by a few inches and provide uniform heat. The preferred heating apparatus further comprises an outer frame 12 for support, a reflection shield 16 for containing the energy and directing it towards the mold surface and a layer of K-wool insulation 18. This provides a lightweight heating apparatus which is easy to change out when a different mold shape is desired to be used.

Figure 4:
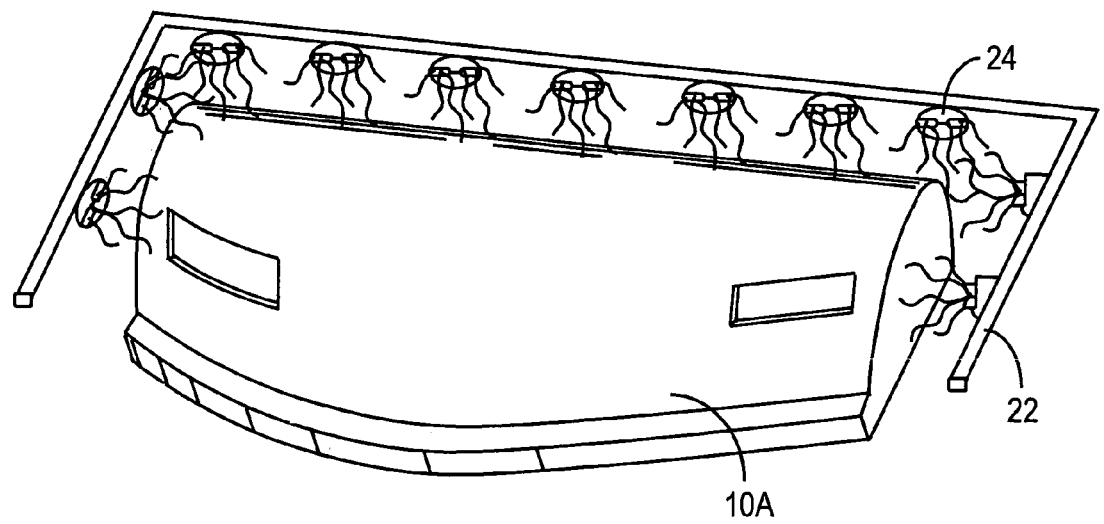
FIG. 4 is a sectional view of the contoured cooling apparatus of the present invention.

To provide a rapid cooling cycle, evaporative cooling is preferably employed. This eliminates the previous problems encountered using ambient air, especially during seasonal extremes (summer heat). In order to minimize the messiness of deluging the mold with water, the hot electroform mold containing the cast shell is sprayed using 100 psi air which atomizes cool water forced through spray nozzles (such as Binks or DeVilbis). As shown in FIG. 4, the spray nozzles are arranged in an adjustable pattern approximating the mold shape to ensure uniformity of cooling. An air over water cooling system using an air surge tank to maintain a constant high volume, high pressure supply was provided. FIG. 4 is a sectional view of the evaporative cooling apparatus. A frame 22 is constructed to follow the shape of the mold and allow for rows of nozzles 24 to be installed along its length. The nozzles 24 are preferably set to be evenly spaced apart and a consistent distance from the mold 10, including its ends, to allow for even and rapid cooling. By spraying a fine mist of air and water, the water will be evaporated and little puddling will result. A robot thus manipulates the mold from heating station (A) (see FIG. 2), to casting station (B), back to heating station (A), and finally to cooling station (C). Having the spray nozzle for cooling in a separate station from heating allows for longer nozzle life without clogging.

Turning now to FIG. 2, the process sequence will be described. An electroformed nickel mold is placed under an IR heating unit in station A, described in FIG. 2 at position 1, in an inverted fashion where the backside of the mold has been painted black to optimize absorptivity. The IR heater elements which have been contoured to resemble the backside of the electroformed mold face the backside of the mold (see FIG. 3). A thermocouple is attached to the mold cavity surface. When the mold reaches the optimum casting temperature for the specific thermoplastic being cast (thermoplastic urethane, polyvinyl chloride, thermoplastic elastomer, thermoplastic olefin and the like), the mold is moved to a casting station B, as shown in FIG. 2 at position 2, where it is clamped to a powder box containing the thermoplastic powder. As the mold box/mold combination is rotated around its major axis, powder contacting the hot mold surface melts to form a uniform plastic layer. After rotation of 20 seconds or so, the mold box is separated with the mold, inverted so that any excess powder falls into the mold box and retracted. The electroformed mold next moves back to the IR heating station A, shown at position 3 in FIG. 2, to complete the fusing process (generally a mold temperature of around 400 degrees F.). After a brief 10 seconds or so, the mold moves to a cooling station C, shown in FIG. 2 at position 4, where a mist of water and air is sprayed on both the front and back surfaces to cool the mold to a strip temperature of 140-150 F. (roughly 60 seconds). Upon reaching the strip temperature, the plastic shell is stripped from the mold at station D, shown in FIG. 2 at position 5, and a new cycle initiated.

While evaporative cooling is preferred here, any process using latent heat (that required to change state) is acceptable so that in addition to water, materials like liquid nitrogen, dry ice, ($CO_2$), etc. can find use. The spray nozzle pattern can be optimized by contouring the nozzle layout to resemble the mold contour.

Thus, it can be seen that the invention provides a new and improved method for producing thin plastic skins or shells from a liquid or powder casting process. By employing electric infrared heating, a simplified process requiring few molds, and much less ducting and conveying apparatus, and which emits significantly less noise and waste heat to the environment is achieved. In addition, a heat balancing method to provide uniform mold temperature, more uniform shell thickness and gloss uniformity is disclosed using black body absorptivity. Further, the use of latent heat of vaporization or sublimation is disclosed to provide significantly faster mold cooling cycles which contribute to faster total cycle times, reducing the number of molds and mold stations required to produce high volumes of shells.

The description and drawings illustratively set forth the presently preferred invention embodiments. The description and drawings are intended to describe these embodiments and not to limit the scope of the invention. Those skilled in the art will appreciate that still other modifications and variations of the present invention are possible in light of the above teaching while remaining within the scope of the following claims. Therefore, within the scope of the claims, one may practice the invention otherwise than as the description and drawings specifically show and describe.

What is claimed is:

1. A method of producing plastic articles, comprising:
    placing a metal mold at a first station to preheat said mold using infrared energy, said mold being contoured and having a back surface and a front surface wherein said infrared energy is directed at said back surface of said mold from a plurality of tubular electric infrared heating elements in a parallel array wherein each element is bent in a pattern to conform to and is spaced from said contoured back surface and wherein said mold does not rotate relative to said heating element array;
    moving said mold to a second station and casting plastic material onto said preheated metal mold front surface;
    moving said mold to another location and fusing said plastic into a substantially uniform layer using infrared energy wherein said infrared energy consists of infrared energy that is directed at said back surface of said mold by a parallel away of tubular electric infrared heating elements;
    moving said mold to a third station and cooling said metal mold using evaporative cooling;
    removing the cast plastic article from said metal mold;
    wherein said array comprising said plurality of conforming tubular electric infrared energy heating elements is spaced about 1-3 inches from the back surface of said mold and said tubes are further spaced about 1-3 inches apart running along the back surface of said mold to provide relatively uniform coverage of said back surface of said mold.

2. The method of claim 1 wherein said heaters operate in the temperature range of 1275-2000 F.

3. The method of claim 1, wherein said metal mold is coated with a coating to improve the absorptivity of said infrared energy.

4. The method of claim 3 wherein said coating is selectively applied to said mold to selectively locate said absorptivity of said infrared energy.

5. The method of claim 1 wherein said evaporative cooling employs latent heat.

6. The method of claim 5 wherein said latent heat is from vaporization.

7. The method of claim 1 wherein said plastic material is a thermoplastic or thermoset.

8. The method of claim 1 wherein said plastic is selected from the group consisting of urethane, vinyl, olefin, acrylic, styrene, thermoplastic elastomer, polysulfone, polyimide, polyphenylene oxide, polyamide, epoxy, and combinations thereof.

9. The method of claim 1 wherein said evaporative cooling comprises contacting said metal mold with a mist of air and water.

10. The method of claim 1 wherein said location for fusing said plastic into a substantially uniform layer comprises said first station.

11. Apparatus for products cast as plastic articles comprising:
  (i) a metal mold to receive cast plastic material, said metal mold being contoured and having a back surface;
  (ii) a plurality of molding stations;
  (iii) a plurality of tubular electric infrared heating elements configured in a parallel away located in one of said plurality of molding stations to heat said mold to a desired casting temperature wherein each of said infrared heating elements is bent in a pattern to conform to and is spaced from and provide heat at said back surface of said mold, wherein said mold does not rotate relative to said heating element array;
  (iv) a cooling device comprising a latent heat system located in another of said plurality of molding stations;
  wherein said away comprising said plurality of conforming tubular electric infrared energy heating elements is spaced about 1-3 inches from the back surface of said mold and said tubes are further spaced about 1-3 inches apart running along the back surface of said mold to provide relatively uniform coverage of said back surface of said mold.

* * * * *

UNITED STATES PATENT AND TRADEMARK OFFICE
CERTIFICATE OF CORRECTION

| | |
|---|---|
| PATENT NO. | : 7,425,294 B2 |
| APPLICATION NO. | : 10/433361 |
| DATED | : September 16, 2008 |
| INVENTOR(S) | : Robert A Grimmer et al. |

It is certified that error appears in the above-identified patent and that said Letters Patent is hereby corrected as shown below:

In column 6, line 56, in Claim 1, delete "away" and insert -- array --, therefor.

In column 8, line 7, in Claim 11, delete "away" and insert -- array --, therefor.

In column 8, line 17, in Claim 11, delete "away" and insert -- array --, therefor.

Signed and Sealed this

Seventh Day of April, 2009

JOHN DOLL
*Acting Director of the United States Patent and Trademark Office*